United States Patent
Jin et al.

(10) Patent No.: US 9,290,410 B2
(45) Date of Patent: Mar. 22, 2016

(54) METHOD FOR SLUDGE CONTROL IN WET ACID ETCHING

(71) Applicant: Corning Incorporated, Corning, NY (US)

(72) Inventors: Yuhui Jin, Painted Post, NY (US); Jun Hou, Painted Post, NY (US); Mehmet Derya Tetiker, Painted Post, NY (US); Shyamala Shanmugam, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 14/403,680

(22) PCT Filed: May 28, 2013

(86) PCT No.: PCT/US2013/042810
§ 371 (c)(1),
(2) Date: Nov. 25, 2014

(87) PCT Pub. No.: WO2013/181123
PCT Pub. Date: Dec. 5, 2013

(65) Prior Publication Data
US 2015/0136736 A1    May 21, 2015

Related U.S. Application Data

(60) Provisional application No. 61/653,705, filed on May 31, 2012.

(51) Int. Cl.
*B44C 1/22* (2006.01)
*C03C 15/00* (2006.01)
*C03C 25/68* (2006.01)
*C23F 1/00* (2006.01)
*C25F 3/00* (2006.01)
*C09K 13/08* (2006.01)

(52) U.S. Cl.
CPC ............. *C03C 15/00* (2013.01); *C09K 13/08* (2013.01)

(58) Field of Classification Search
CPC ................................. C03C 15/00; C03C 19/00
USPC ................................................................. 216/97
See application file for complete search history.

(56) References Cited

U.S. PATENT DOCUMENTS

| | | | |
|---|---|---|---|
| 2007/0215835 A1* | 9/2007 | Kikuyama et al. | 252/79.3 |
| 2009/0110914 A1 | 4/2009 | Zhuang et al. | |
| 2010/0224589 A1 | 9/2010 | Saijo et al. | |

FOREIGN PATENT DOCUMENTS

| | | |
|---|---|---|
| CN | 1393418 A | 1/2002 |
| EP | 1422203 | 2/2002 |
| JP | 2003/012305 A | 6/2001 |

(Continued)

*Primary Examiner* — Roberts Culbert
(74) *Attorney, Agent, or Firm* — Kevin M. Able

(57) ABSTRACT

The disclosure is directed to a method for controlling the sludge that is generated during the wet acid etching of glass articles. The four Factors that need to be controlled are (i) the dissolved glass level A; (ii) the HF concentration B; (iii) the second acid concentration C, the second acid being a strong acid, and (iv) the solubility constant D of the precipitate, Ksp, which is controlled by changing temperature or ionic strength. The disclosed method utilized HF as the etchant and a strong acid selected from the group consisting of HCl, $H_2SO_4$, $HNO_3$ and $HClO_4$.

14 Claims, 12 Drawing Sheets

(56) References Cited

FOREIGN PATENT DOCUMENTS

| | | |
|---|---|---|
| JP | 03/020255 | 1/2003 |
| KR | 04370737 B2 | 6/2001 |
| KR | 2009/094578 A | 3/2008 |
| KR | 943321 B1 | 3/2008 |
| KR | 2011/032432 A | 9/2009 |
| KR | 2011/056095 A | 11/2009 |
| TW | 527320 B | 12/2001 |
| WO | WO2009/157378 | 12/2009 |
| WO | 2013/101444 A1 | 12/2012 |
| WO | 2013/018121 | 5/2013 |

* cited by examiner

Precipitate (g/L) Contour at 22°C, 4 g/L of EXG

Precipitate (g/L) Contour at 27°C, 4 g/L of EXG

Precipitate (g/L) Contour at 27°C, 7 g/L of EXG

27°C, 7 g/L 0.500
0.750
1.000
1.250
1.500
1.750

Precipitate (g/L) Contour at 32°C, 7 g/L of EXG

32°C, 7 g/L 0.200
0.400
0.600
0.800
1.000
1.200
1.400
1.600

Precipitate (g/L) Contour at 27°C, 7 g/L of EXG

27°C, 7 g/L 0.500
1.000
1.500
2.000
2.500

Precipitate (g/L) Contour at 32°C, 7 g/L of EXG

32°C, 7 g/L 0.250
0.500
0.750
1.000
1.250
1.500

| Parameter | Estimate | Low | High |
|---|---|---|---|
| theta1 | 0.9989428989 | 0.54372 | 1.2528 |
| theta2 | -6.614208e-9 | -2e-13 | 1.6e-13 |
| theta3 | 2.4 | -4.3615 | 12.9483 |

METHOD FOR SLUDGE CONTROL IN WET ACID ETCHING

This application claims the benefit of priority under 35 U.S.C. §119 of U.S. Provisional Application Ser. No. 61/653,705 filed on May 31, 2012 the content of which is relied upon and incorporated herein by reference in its entirety.

FIELD

This disclosure is directed to a method for controlling the sludge that is generated during the wet acid etching of glass articles.

BACKGROUND

This disclosure is related to the technology of reducing the sludge (precipitation) in the process of wet etching and thinning of glass using hydrofluoric acid (HF) and etchant containing HF. The existence of sludge in etchant significantly interrupts the etching process and reduces the quality of etching product. Sludge (or precipitation) in the etchant (or etching bath) induces defects such as pimples and rimples (wrinkles) to a glass surface during etching. In addition, the accumulation of sludge in the etching bath can severely hinder the glass etching operation and it also results in deposition of by-products on the surface of the etched glass which requires brush cleaning to meet the stringent optical and cosmetic requirements. Contact cleaning such as brush cleaning can damage a fresh glass surface and compromise the mechanical performance of the glass. The prevention or reduction of the precipitation in etching bath or etchant improves the efficiency of glass etching process, and also reduces costs regarding material consumption and machine maintenance.

The methods of the addressing sludge issues can be divided into two categories: physical separation and chemical inhibition. The method of physical separation focuses on separating the sludge (solid) from an etchant such as HF (liquid), which is a physical process to regenerate a sludge free etchant. Methods of filtering used HF solutions containing sludge. are disclosed in JP-04370737B2, JP-2003012305A, CN-1393418A, and TW-527320B. The sludge can be removed by filtration and centrifugation. In patents KR-943321B1 and KR-2009094578A, HF and sludge are separated by heating the solution containing HF and sludge. In this way, HF is recycled by collecting HF from the gas phase, and sludge is condensed by heating. However, the efficiency of separation can be low, and the cost for operation is also relatively high for this method. Overall, while physical separation can recycle the active component (for example HF) from the used etchant, and separate the sludge of large particulate dimensions. there are limitations to the physical method including:

(1) There is a requirement of sludge separation equipment, which increases the cost for equipment purchasing and maintaining.
(2) The use of a separation method such as heating increases the energy consumption.
(3) The separation can only partially remove sludge from etchant. For example, while a sludge of large size particles may be easily removed by centrifugation or filtration, small sludge particles stay in etchant and continuously impact the performance of the recycled etchant.
(4) The formation of sludge is a slow process, which means sludge will form even after physical separation.

Thus, the sludge problem cannot be completely resolved by employing a physical method alone.

The chemical method is complementary to the physical method for sludge management. The chemical method reduces or inhibits the formation of sludge in the etchant rather than separating the sludge from etchant. Therefore, the chemical method possesses several advantages which include:

(1) It does not require the installation of experiment equipment.
(2) The process does not consume extra energy.
(3) The process can inhibit the formation of sludge or reduce the quantity of sludge.
(4) The cost for glass etching can be reduced by applying an appropriate chemical strategy for etching.

Combining the chemical method together with the physical method, the sludge problem can be managed more effectively and efficiently.

Currently, there are few references that report the chemical method for sludge management. Patents KR-2011032432A and KR-2011056095A disclose a strategy of stabilizing the sludge particles in solution and preventing them from aggregation by adding surfactant molecules into etchant. This method reduces the adsorption of the sludge particles on glass, and reduces the formation of defects during etching. However, sludge and sludge particles still exist even after the addition of surfactant. Further, the quantity of sludge does not change. These sludge particles can still induce defects and cause problems as the quantity of sludge increases. The method does not fundamentally resolve the problem of sludge.

Overall, the chemical method for sludge management is promising because of several advantages: (1) Effective in sludge reduction, (2) Low cost, and (3) Ease of implementation. However, there are several challenges which include:

(1) Determining a systematic, chemical strategy for controlling the sludge formation is still lacking.
(2) The correlation of etching chemical factors on sludge manipulation have not been claimed or published.
(3) A fundamental understanding of sludge formation is still unknown.
(4) The chemical (only) strategy for sludge reduction has only been developed for limited types of glasses such as ion-exchanged Corning® Code 2318 an alkali alumino silicate glass. However, the principles involved are applicable to other types of glass, for example, Corning® Eagle XG™ which is an alkaline earth aluminoborosilicate glass.

The present disclosure provides a solution to the forgoing challenges, and describes a systematic chemical strategy based on a an understanding of sludge formation and the correlation of chemical and environmental factors.

SUMMARY

The present disclosure describes a systematic chemical method to meet the aforementioned challenges and to minimize the formation of precipitation in an etchant used for glass etching. The disclosed method enhances the efficiency of etchant utilization, which reduces the consumption of etchant and related costs.

The method of the disclosure was developed based on both the experimental discovery and the fundamental understanding to the chemistry of etching of glass and formation of sludge as is illustrated in FIG. 1. Fundamentally, the quantity of sludge is mainly determined by four Factors as are shown in FIG. 2 in which the dissolved glass level A, the HF concentration B, the second acid concentration C (hydrochloric acid (HCl) and sulfuric acid ($H_2SO_4$)), and the solubility constant D of the precipitate (Ksp), which can be controlled by changing temperature or ionic strength). By manipulating these four Factors, the quantity of sludge can be eliminated or significantly reduced.

In this disclosure, the sludge formation of Corning® Eagle XG™ glass (hereinafter simply the "glass" or "EXG") was used an exemplary glass for etching. The principles and method taught herein can be applied to any glass material that is etched and produces a sludge. The mixture of HF and a second acid (for example, HCl, $H_2SO_4$, $HClO_4$ or $HNO_3$) at different ratios was employed as etchant for glass etching. The data from the study validates that all the four Factors impacting the formation and the quantity of the sludge produced in the etching process. The functions of these four Factors and the reactions of FIGS. 1 and 2 are explained below.

In one aspect the disclosure is directed to a method for controlling the amount of sludge in a glass wet etching process, the method comprising controlling the hydrogen ion concentration in a glass wet HF etchant solution by the addition of a second strong acid to the solution. The amount of sludge is controlled by the control of four Factors consisting of (i) the dissolved glass level A; (ii) the HF concentration B; (iii) the second acid concentration C, the second acid being a strong acid; and (iv) the solubility constant D of the precipitate, Ksp, which is controlled by changing temperature or ionic strength. The second strong acid is selected from the group consisting of HCl, $H_2SO_4$, $HNO_3$ and $HClO_4$. In addition, the glass being etched in this example is an oxide glass containing, among other elements, at least one metal selected from the group consisting of alkali metals, alkaline earth metals, aluminum, zirconium, iron, and titanium, and a mixture of any of the foregoing. By increasing the hydrogen ion concentration the dissociation of HF to $H^{+1}$ and fluoride ion ($F^{-1}$) is driven to form HF, thus limiting the amount of fluoride ion freely available. As the results herein show, increasing the fluoride ion concentration increases sludge formation. The temperature range for the etchant bath is in the range of 15-40° C. In one embodiment the temperature for the etchant bath is in the range of 20-32° C. In another embodiment the temperature of the etchant bath is in the range of 22-32° C.

$$ppt\ (g/L) = \theta_1 - \theta_2/[F^-]^{\theta_3}$$

based on the proposed formula (Eq. 1) in this specification which is:

$$\text{Precipitation (g/L)} = \text{Factor } A - (Ksp/(\text{Factor } B/\text{Factor } C)) + \text{Factor } D.$$

DETAILED DESCRIPTION

Herein Eagle XG™ glass (Corning Incorporated) was used an exemplary glass to exemplify the principles and methods taught by this disclosure which can be applied to any glass materials is etched, and it is referred to herein as "glass" or "EXG". Herein the term "sludge" and "precipitate" may be used interchangeable, and they refer to the particulate material that may be suspended in the etchant or settles out of the etchant. The term "dissolved glass" refers to the glass that is removed and whose constituent components are in solution as ionic species. At some point during the etching process the solubility limit of the species is reached and they begin to settle out of the etchant solution. In addition, complex ions containing, for example without limitation, two or more metallic ions may form and these complex ions may have a lower solubility limit than simple ionic species and thus begin to settle out of the etchant solution.

Figure 1:
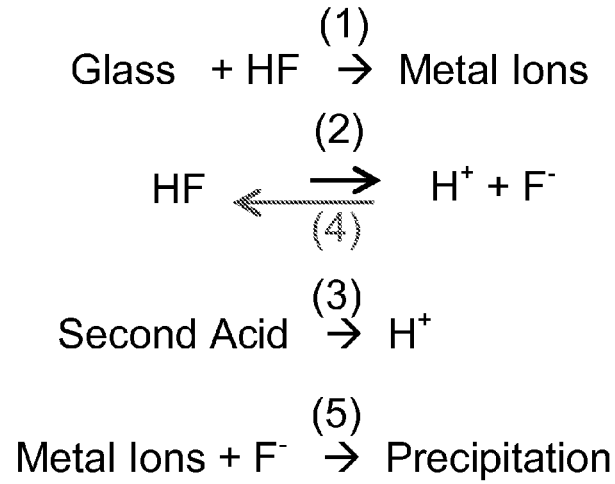
FIG. 1 illustrates some of the reactions taking place during the glass etching process.
Figure 2:
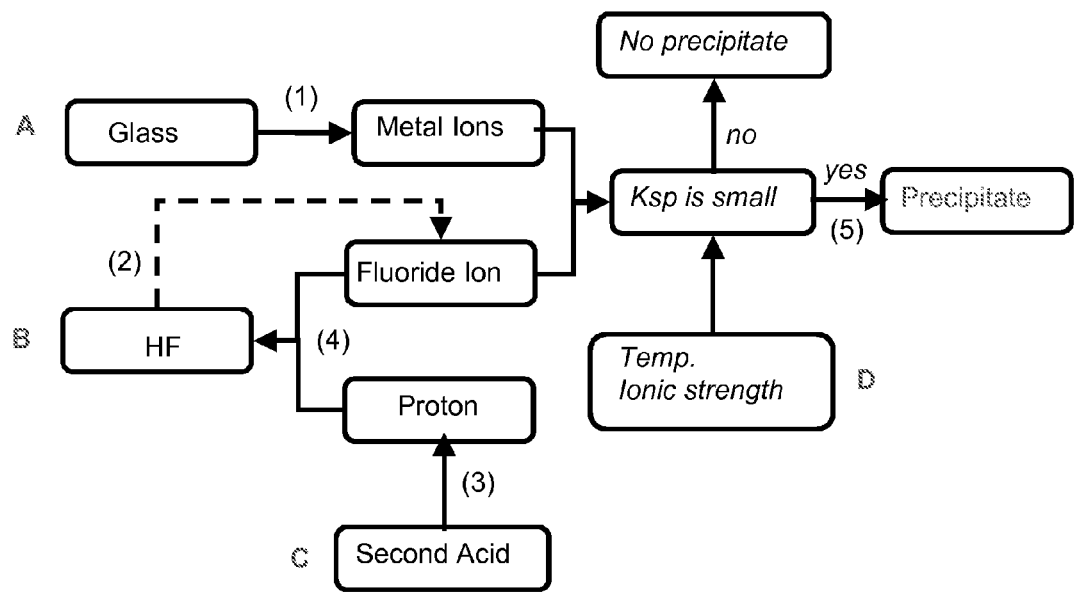
FIG. 2 illustrates the manipulation of the formation and the quantity of sludge in acid glass etching.

The Function of the Four Factors Illustrated in FIGS. 1 and 2

"A" is the quantity of dissolved glass. Increasing the dissolved glass level can produce more metal ions in the solution through reaction (1), which may combine with fluoride ion and form precipitate (Reaction (5)).

"B" is the concentration of HF, the etchant. In an etchant containing HF and a second acid, HF is the only source of fluoride ions. HF releases more fluoride ions into the etchant as the concentration of HF increases (reaction (2)), and the fluoride ions can further bind with certain types of metal ions and form precipitate through reaction (5) in FIG. 1.

"C" is the concentration of second acid in the etchant. The function of second acid for sludge management is to inhibit the release of fluoride ions from HF. Because protons can bind with fluoride ion through FIG. 1 reaction (4) to regenerate HF, and inhibit further dissociation of HF in the etchant, adding second acid can increase the concentration of protons (through reaction in FIGS. 1 and 2), and reduce the concentration of fluoride ion through reaction (4) in FIGS. 1 and 2. Consequently, the quantity of precipitate is reduced because the amount of fluoride ion for sludge generation (reaction (5) is reduced. Factors (B) and (C) are correlated, the ratio of factor (B) and factor (C) (Molar ratio of B and C: [HF]/

[Proton activity of Second Acid]) determines the amount of fluoride ions in the etchant, and the quantity of sludge formation.

Factor "D" is the formation constant (Ksp). The formation constant (Ksp) determines the critical concentration at which fluoride ions and metal ions start to precipitate out from solution. Increasing the Ksp value is to elevate the threshold for sludge formation and reduce the quantity of sludge without changing Factors (A), (B) or (C). For example, increasing the solution temperature can increase the Ksp value and reduce the formation of sludge. The increase of the total ionic strength of the solution (the total concentration of HF, second acid and dissolved glass) will reduce the apparent value of Ksp and cause more sludge in the solution.

The Reactions Illustrated in FIGS. 1 and 2

FIG. 1 illustrates the reactions in the process of glass etching. In reaction (1) the glass is etched by HF and metal ions are released in to the solution. In reaction (2) the HF dissociates and produces protons and fluoride ions. In reaction (3) the second acid in the etchant (a strong acid such as HCl or $H_2SO_4$) generates protons. In reaction (4) the protons and fluoride ions bind together and regenerate HF molecule. In reaction (5) the metal ions from reaction (1) and fluoride ions from reaction (2) bind together and form insoluble salts as a precipitate.

FIG. 2 illustrates the manipulation of the formation and the quantity of sludge in the acid etching of glass. Reactions (1)-(5) are explained in the paragraph immediately above regarding FIG. 1. The quantity of precipitate is determined by the four Factors A, B, C and D.

Figure 7:
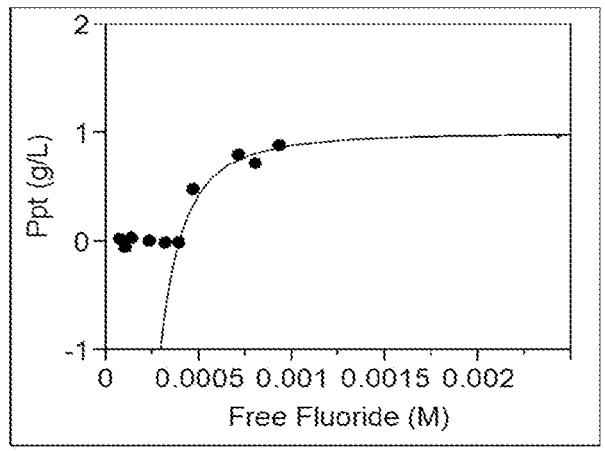
FIG. 7 illustrates that increasing free fluoride concentration in solution generates more precipitation (Ppt) from an etchant containing 4 g/L of dissolved glass.

A model for calculating the quantity of precipitation is also developed based on the experimental results and the fundamental understanding of the sludge formation (Equation 1). In this model, the quantity of precipitation is determined by four factors. Some constant values need to be applied together with each factor to simulate a specific system. Factor D (ionic strength) is not taken into account until the total ionic strength becomes high enough. For example, in $HF/H_2SO_4$ system, at the dissolved glass level at 4 g/L, the quantity of precipitation is plotted versus the fluoride ion concentration calculated from the values for Factor B and C (FIG. 7). The experimental data is then validated on the model equation ignoring the effect of Factor D. The fitted curve using the nonlinear model equation exhibits good agreement to the experiment data measured. The fitted function parameters of the model is:

$$\text{Precipitation (g/L)} = 1 - 6.6 \ast 10^{-9} / [F^-]^{2.4},$$

where $[F^-]$ is the fluoride ion concentration. This result proves that Equation 1, immediately below, is applicable and practical with regard to sludge management.

$$\text{Precipitation (g/L)} = \text{Factor } A - (Ksp/(\text{Factor } B/\text{Factor } C)) + \text{Factor } D \quad \text{(Eq. 1)}$$

Figure 3:
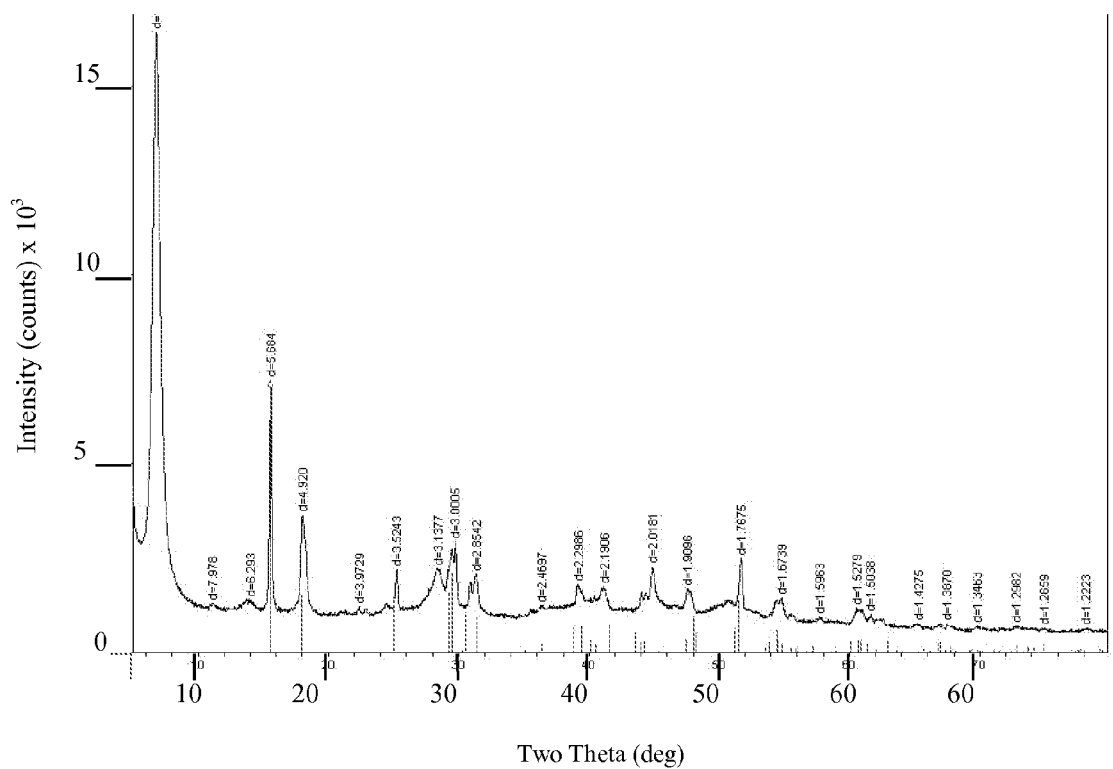
FIG. 3 is the XRD spectrum of the precipitate formed in an etchant of 3 MN HF and 6M HCl with 10 g/L of dissolved EXG glass; the results indicating that magnesium aluminum fluoride hydrates [$MgAlF_5.(H_2O)_2$] is one of the crystal phases in the precipitate, Mg being an alkaline earth metal present in the glass composition.
Figure 4:
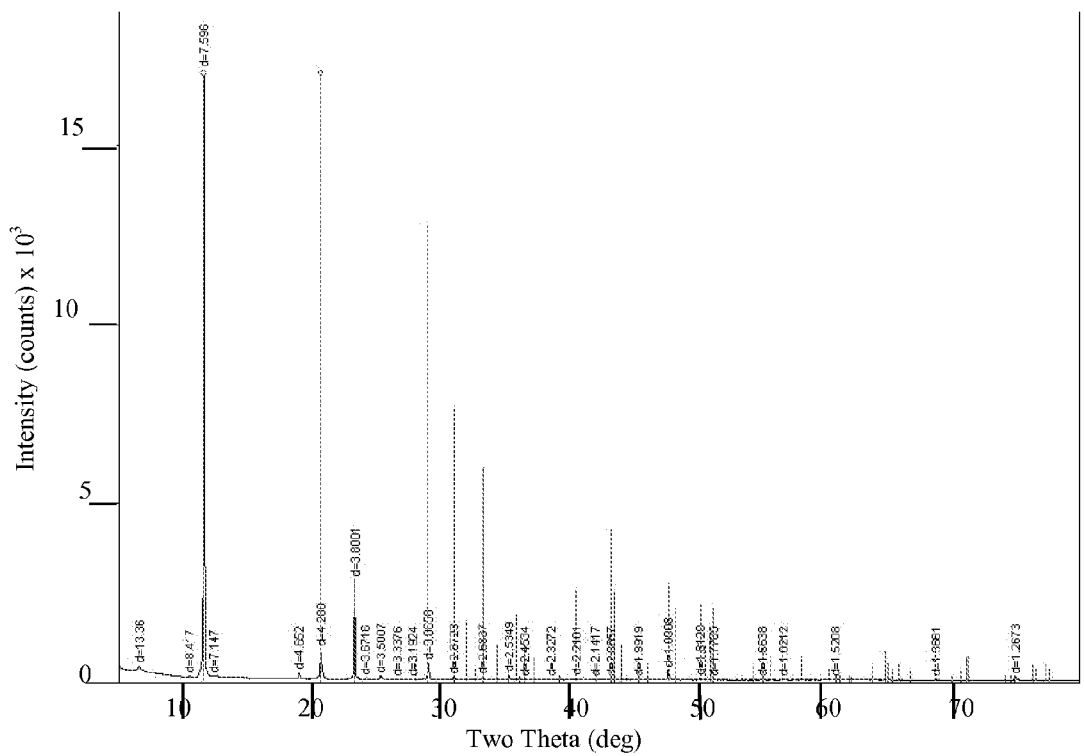
FIG. 4 XRD spectrum of the precipitate formed in the etchant of 1.5M HF and 1.5M $H_2SO_4$ with 4 gram/L of dissolved EXG glass; the result indicating that $CaSO_4.2H_2O$ is the major phase in the precipitate.

FIGS. 3 and 4 are XRD spectra of the precipitate or sludge for using different etchant solutions. The XRD spectrum of FIG. 3 indicates in an etchant of 3M HF and 6M HCl with 10 gram/L of dissolved glass one of the crystal phases in the sludge is $MgAlF_5(H2O)_2$. The XRD spectrum of FIG. 4 indicates than an etchant of 1.5M HF and 1.5M $H_2SO_4$ with 4 gram/L of dissolved glass the major phase in the precipitate is $CaSO_4 \cdot 2H_2O$.

FIGS. 5A-5G and 6A-6G

Figure 5A:
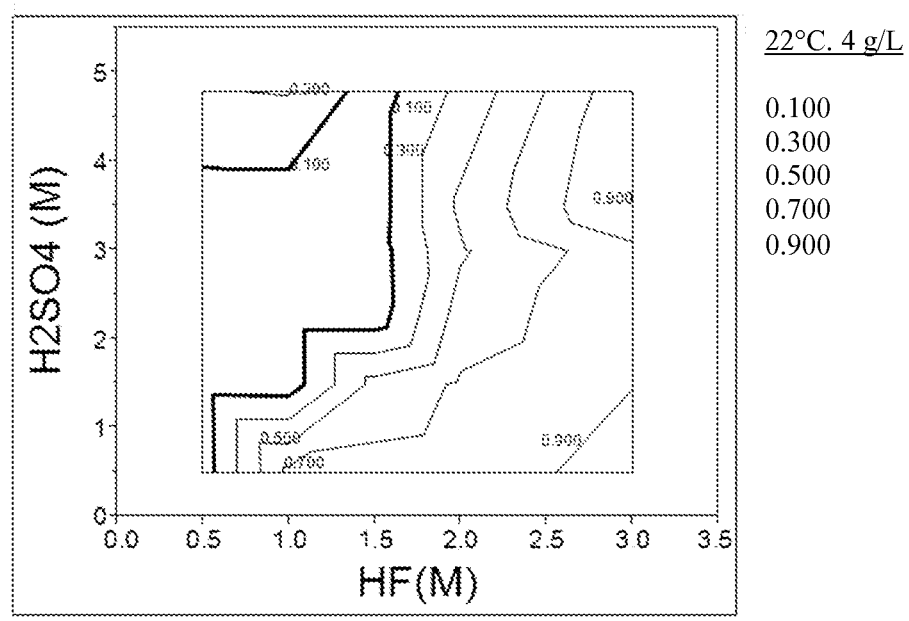
FIGS. 5A-5G are precipitation contour plots illustrating the effect of the quantity of dissolved glass on the formation of the sludge for an HF/$H_2SO_4$ etchant containing different concentrations of EXG glass at different temperatures; 5A-5C containing 4 g/L of EXG glass at 22° C., 27° C. and 32° C., respectively; 5D-5F containing 7 g/L of EXG glass at 22° C., 27° C. and 32C, respectively; and 5G contains 10 g/L of EXG glass at 32° C.

FIGS. 5A-5G and 6A-6G are precipitation contour plots illustrating the effect of the quantity of dissolved glass in the sludge for an HF/HCl etchant (FIGS. 6A-6G), and for an $HF/H_2SO_4$ etchant (FIGS. 5A-5G) containing different concentrations of EXG at different temperatures. The values for the various contour lines are shown in the Figures and in the table to the right of each figure. The contour lines increase in numerical value from left to right. It is suggested that the contour lines be read at near the bottom of each Figure. Using FIG. 5A as an example, from left to right, the contour line values are 0.100 (heavy black line), 0.300, 0.500, 0.700 and 0.900. The heavy black lines in each Figure define the "precipitation-free" zone or area. The "precipitation-free" zone is the area where there is no precipitate in the vessel when the glass concentration in the etchant is as indicated for the Figure. In FIG. 5A the glass concentration in the etchant solution is at 4 g/L as indicated in the top legend. Again using FIG. 5A as an example, for an etchant bath containing 4 g/L EXG glass, if (a1) the etchant HF concentration is in the range of greater than 0.5M to approximately 1.0M, and (b1) the $H_2SO_4$ concentration in the etchant is in the range of approximately 1.2M to approximately 4M, the amount of precipitate in the etchant bath is less than 0.100 g/L. However, if (a2) the HF concentration rises to a value greater than 1.0M to approximately 1.5-1.6M, then (b2) the $H_2SO_4$ concentration must be at least in the range of greater than 2M to 4M or a precipitate (sludge) will form. Finally, if the HF concentration is raised and the $H_2SO_4$ concentration held constant, the amount of sludge increases as the HF concentration increases as indicated by the contour lines.

Figure 5B:
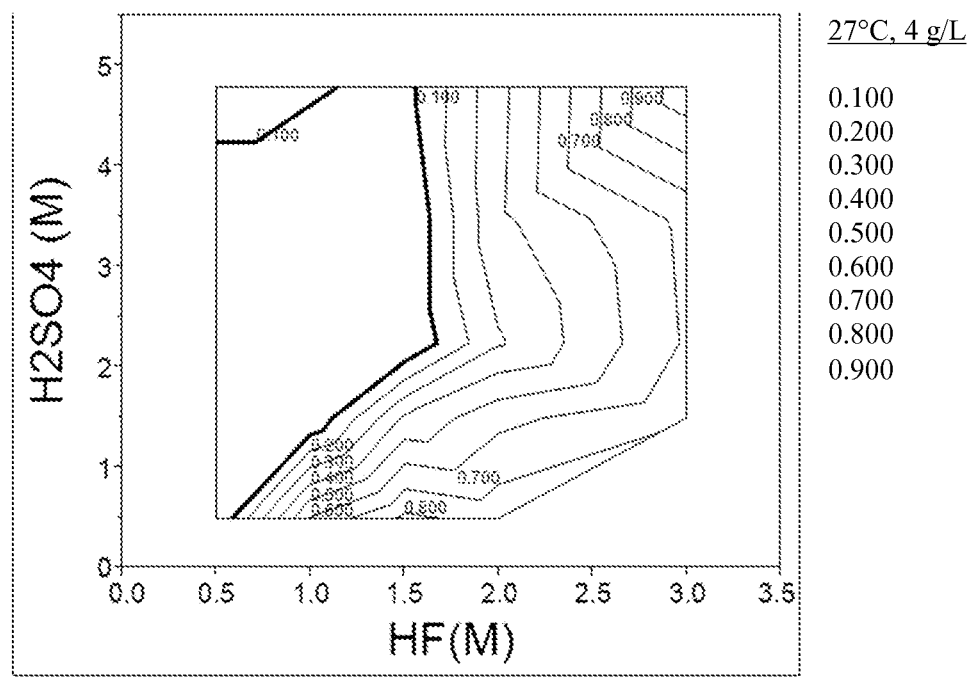
Figure 5C:
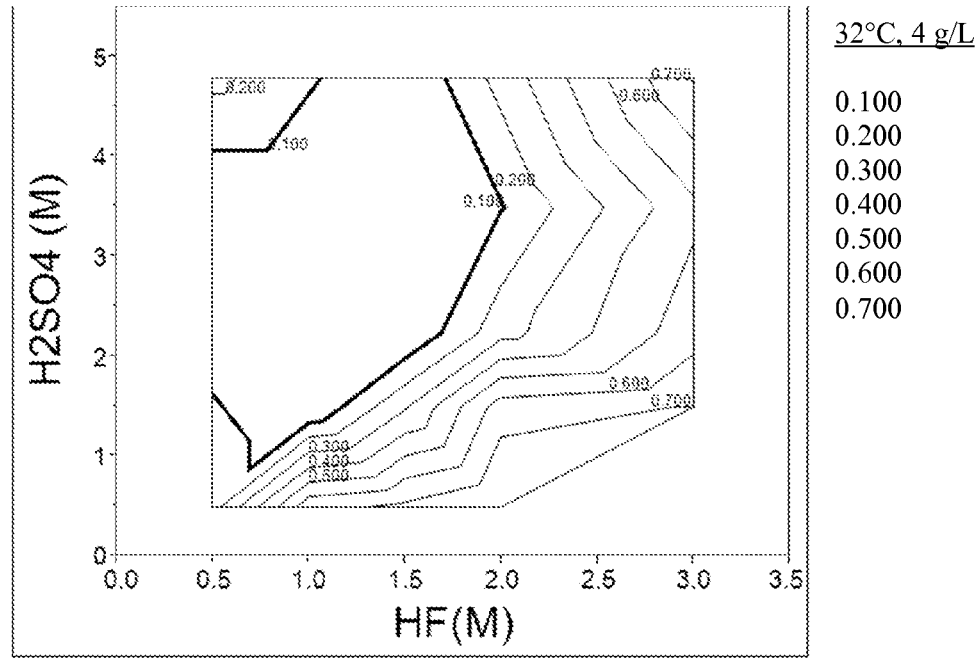
Figure 5D:
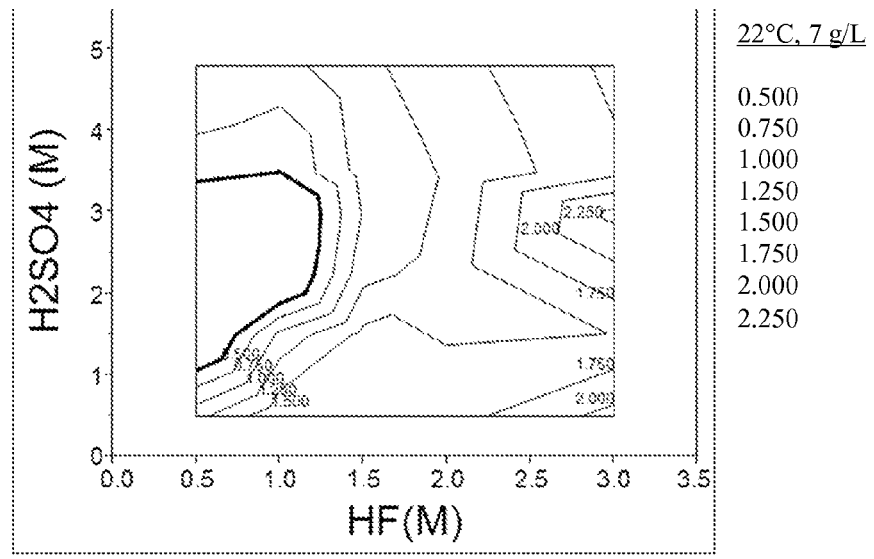
Figure 5E:
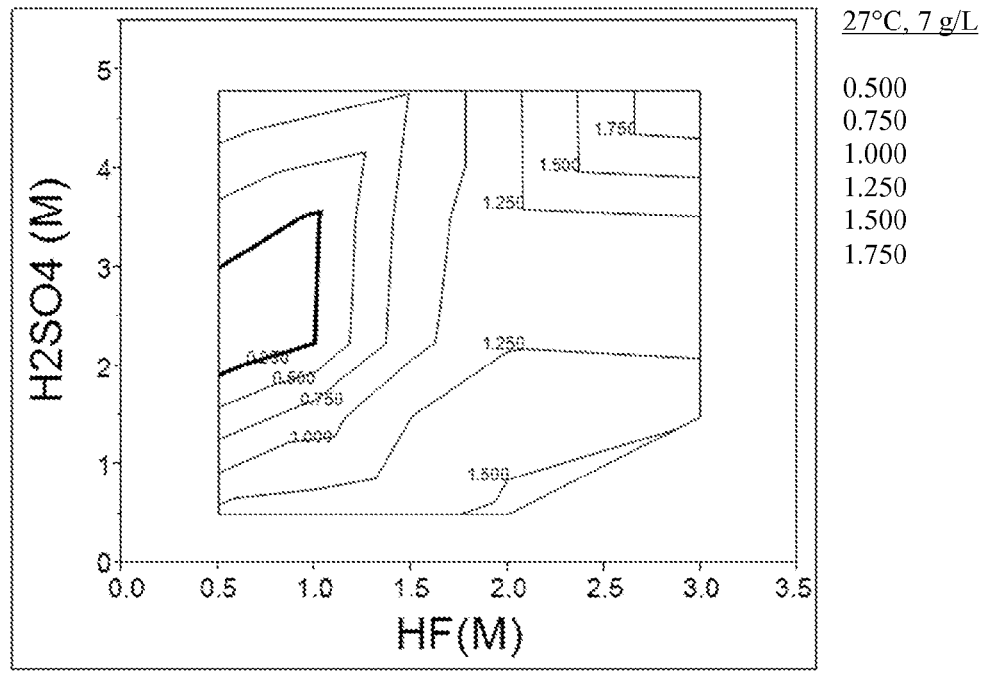
Figure 5F:
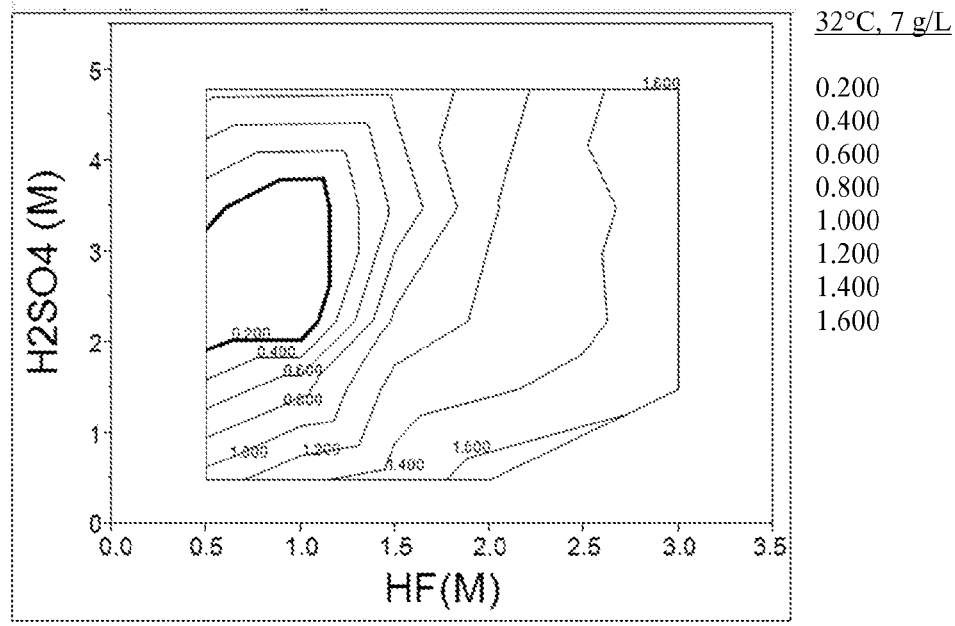
Figure 5G:
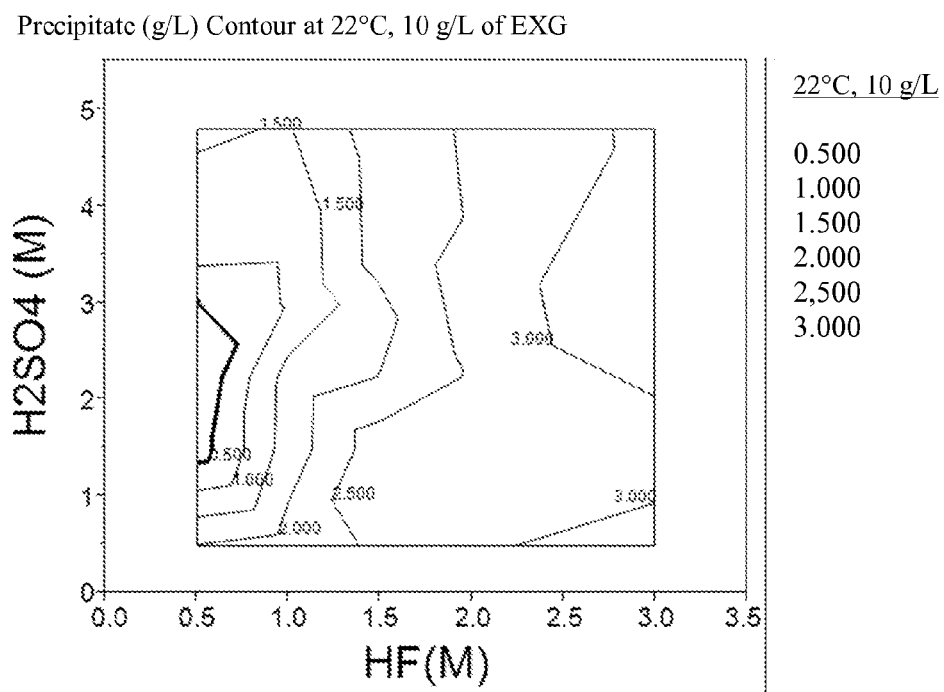

FIGS. 5A, 5D, and 5G illustrate the effect of the quantity of the dissolved glass on the formation of sludge. The three figures show the precipitate contours in the etchant consisting of HF and $H_2SO_4$. The numbers in these figures, and all other FIGS. 5A-5G and 6A-6G, are measurement points and the corresponding values of precipitate in gram/L (g/L). FIG. 5A is the precipitate contour with 4 gram/L of dissolved glass at 22° C. FIG. 5D is the precipitate contour with 7 gram/L of dissolved EXG glass at 22° C. FIG. 5G is the precipitate contour with 10 gram/L of dissolved EXG glass at 22° C. The dashed line boxes highlight areas representing the precipitation free zones in etch plots. The comparison of the two figures shows that the quantity of precipitate evolves in the same way. The amount of precipitate is much higher in the etchant containing 10 gram/L of glass than the ones containing 7 gram/L and 4 gram/L of glass. The front border of the precipitation free zone also retreats from approximately 1.5M of HF to approximately 1M of HF and 0.5M of HF as the dissolved glass level increases from 4 gram/L to 7 gram/L, and to 10 gram/L.

FIGS. 5A, 5B, and 5C illustrate the effect of temperature on the formation of sludge. The three figures show the precipitate contours in the etchant of HF and $H_2SO_4$. The black dots and numbers in the Figures are measurement points and the corresponding values of precipitate in gram/L (g/L). FIG. 5A is the precipitate contour with 4 gram/L of dissolved glass at 22° C. FIG. 5B is the precipitate contour with 4 gram/L of dissolved glass at 27° C. FIG. 5C is the precipitate contour with 4 gram/L of dissolved glass at 32° C. The comparison of the three figures show that the quantity of precipitate evolves in the same way. Overall, the amount of the precipitate is slightly reduced by increasing the temperature from 22° C. to 32° C. Similar phenomena are also observed when 7 gram/L of glass dissolved in the etchant at different temperature (FIGS. 5D, 5E, and 5F). The temperature range for the etchant bath is in the range of 15-40° C. In one embodiment the temperature for the etchant bath is in the range of 20-32° C. While the etchant bath can be run at temperatures less than 15° C., this is uneconomical because the bath generally has to be cooled and the rate of etching decreases. While an etchant bath with a temperature greater than 40° C. can also be used, this may also be uneconomical because it could require heating and could cause environmental problems, for example, the higher temperatures would cause some HF and some second acids such as HCl and HNO₃ to be driven from the etchant bath and require the use of vapor scrubbers.

Figure 6A:
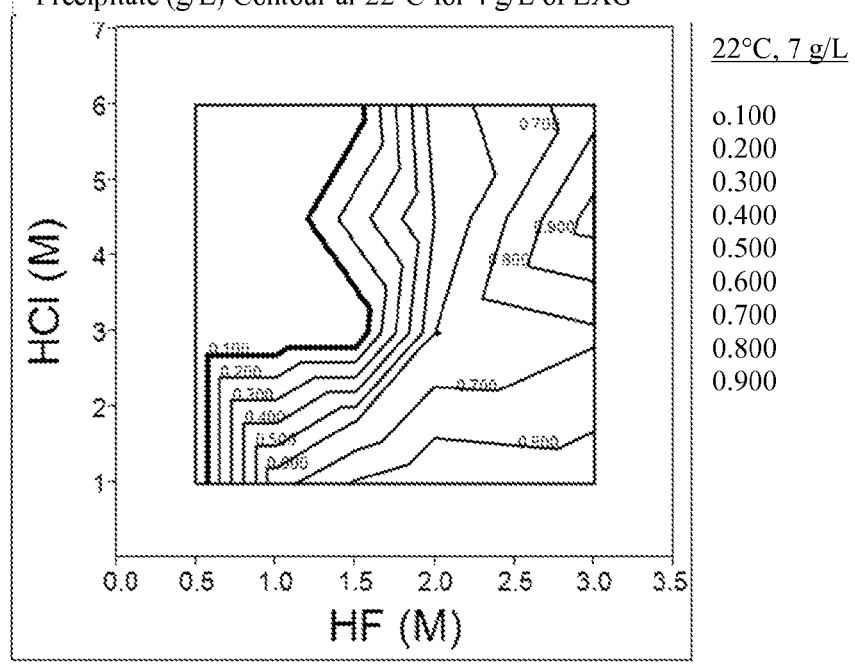
FIGS. 6A-6G are precipitation contour plots illustrating the effect of the quantity of dissolved glass in the sludge for an HF/HCl etchant containing different concentrations of EXG at different temperatures; 6A-6C containing 4 g/L of EXG glass at 22° C., 27° C., and 32° C., respectively; 6D-6F containing 7 g/L of EXG glass at 22° C., 27° C., and 32C, respectively; and 6G containing 10 g/L of EXG glass at 32° C.
Figure 6B:
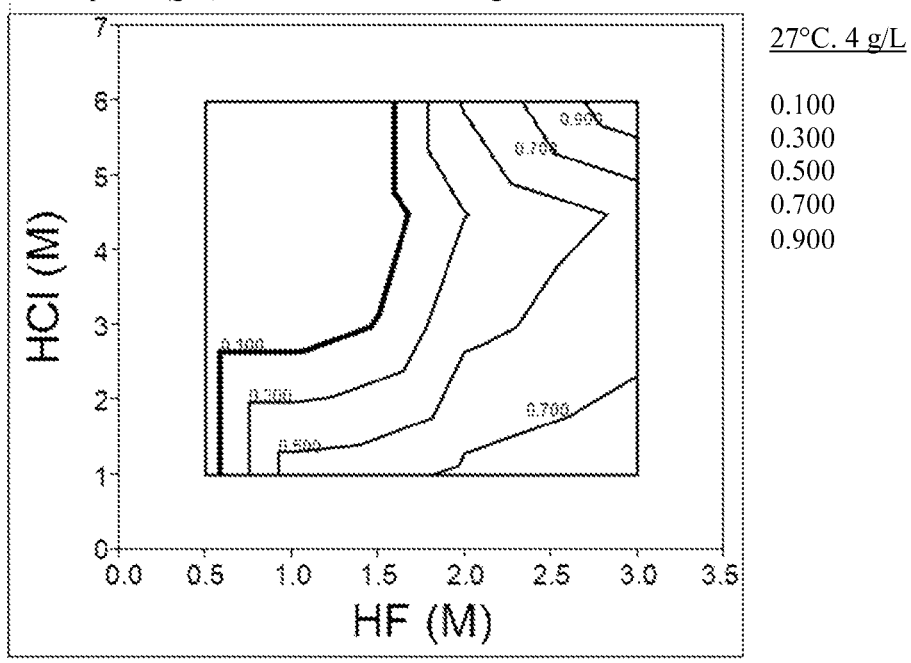
Figure 6C:
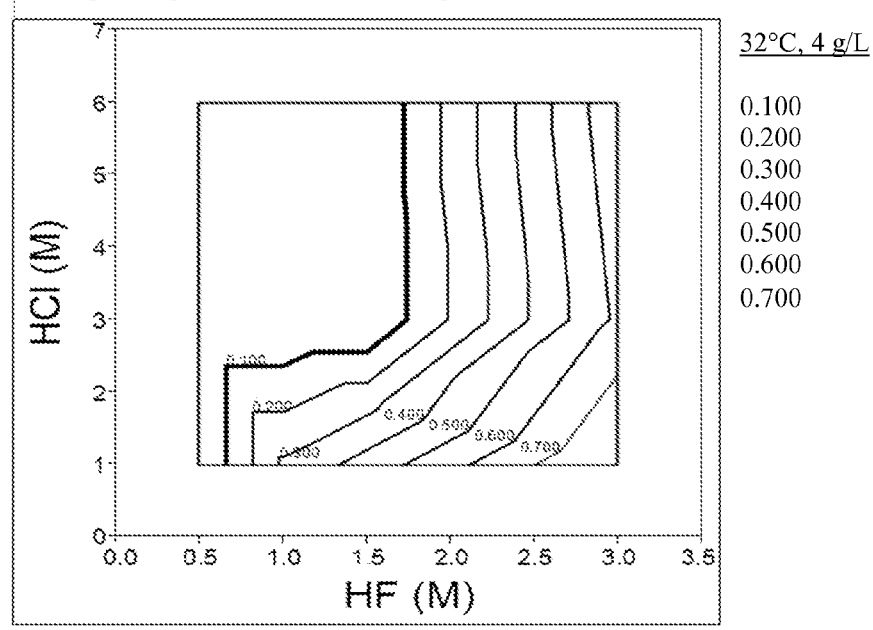
Figure 6D:
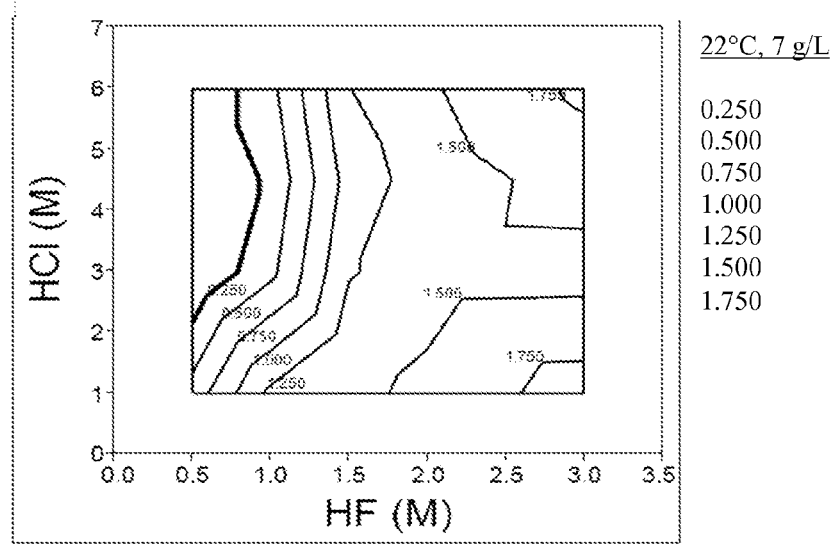
Figure 6E:
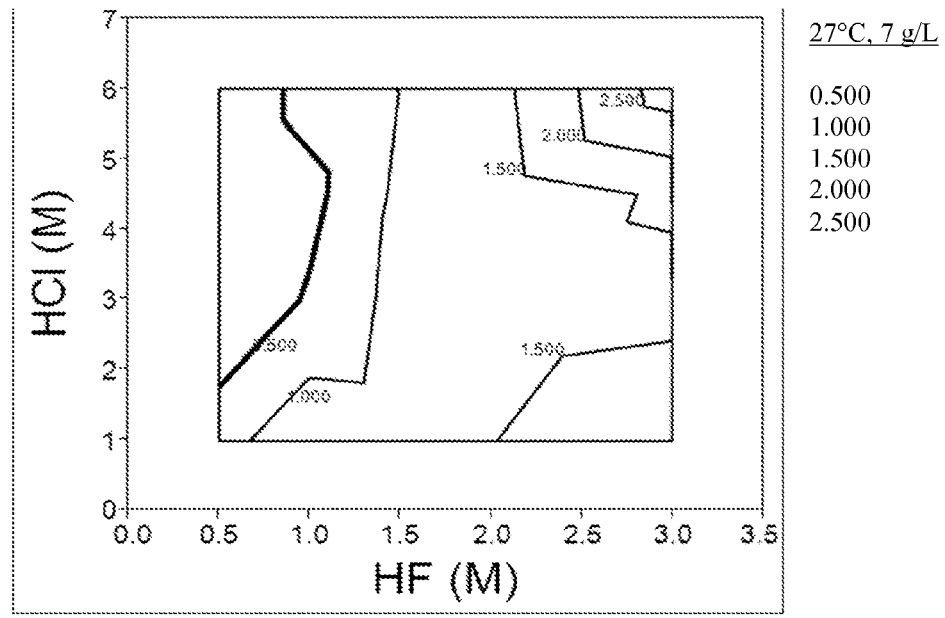
Figure 6F:
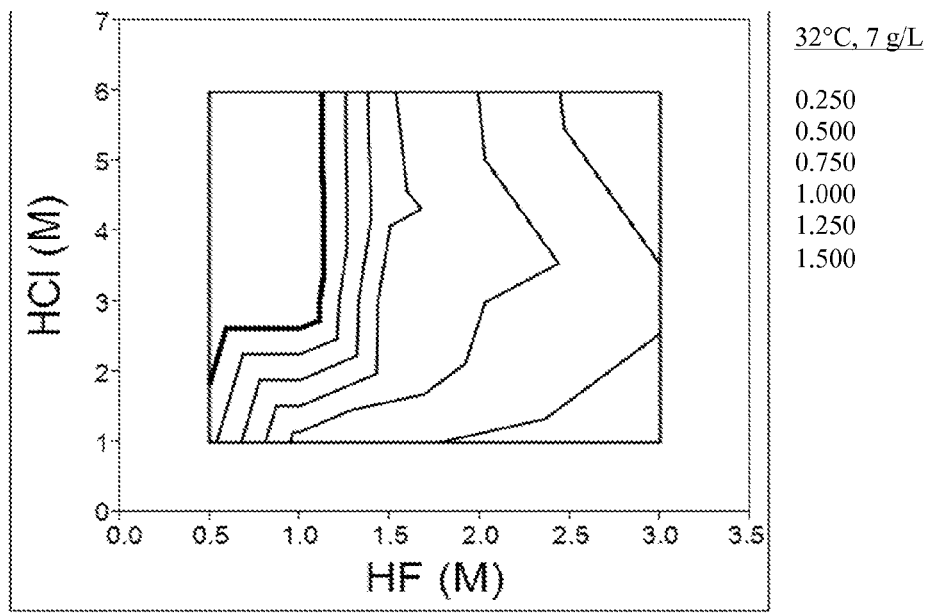
Figure 6G:
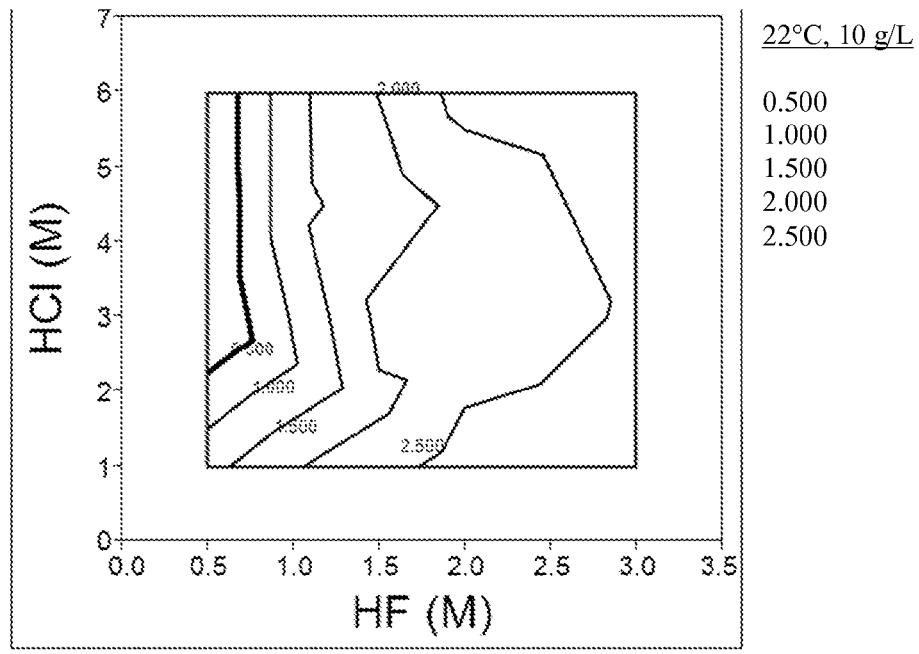

FIGS. 6A, 6D, and 6G illustrate the effect of the quantity of the dissolved glass on the formation of sludge. The three figures show the precipitate contours in the etchant of HF and HCl. The black dots and numbers in figures are measurement points and the corresponding values of precipitate in gram/L. FIG. 6A is the precipitate contour with 4 gram/L of dissolved glass at 22° C. FIG. 6D is the precipitate contour with 7 gram/L of dissolved glass at 22° C. FIG. 6G is the precipitate contour with 10 gram/L of dissolved glass at 22° C. The comparison of the three figures show that the quantity of precipitate evolves in the same way. The amount of precipitate is much higher in the etchant containing 10 gram/L of EXG than the ones containing 4 gram/L and 7 gram/L of glass. The front border of the precipitation free zone also retreats from 1.5M of HF to below 1M of HF and 0.5M of HF as the dissolved glass level increases from 4 gram/L to 7 gram/L, and to 10 gram/L. In all three plots, when HF concentration is higher than 2M, increasing HCl concentration from 1 to 3M reduces the quantity of precipitation, but further increasing the HCl concentration to 6M causes the formation of more precipitation because of the effect of ionic strength.

FIGS. 6A, 6B, and 6C illustrate the effect of temperature on the formation of sludge. The three figures show the precipitate contours in the etchant of HF and HCl. The black dots and numbers in figures are measurement points and the corresponding values of precipitate in gram/L. FIG. 6A is the precipitate contour with 4 gram/L of dissolved glass at 22° C. FIG. 6B is the precipitate contour with 4 gram/L of dissolved glass at 27° C. FIG. 6C is the precipitate contour with 4 gram/L of dissolved glass at 32° C. The comparison of the three figures show that the quantity of precipitate evolves in the same way. Overall, the amount of the precipitate is slightly reduced by temperature from 22° C. to 32° C. Similar phenomena are also observed when 7 gram/L of glass dissolved in the etchant at different temperature (FIGS. 6D, 6E, and 6F).

Both FIG. 5 and FIG. 6 illustrate the effect of adding a second acid on inhibiting or reducing the formation of precipitate (or sludge). The contour plots represent the quantity of precipitation after dissolving glass into etchant containing HF and a second acid (HCl or $H_2SO_4$) at various ratio. Black dots and numbers in the figures are measurement points and their quantities of precipitate in gram/L. The lines are contours of precipitate at various levels. In FIG. 6 the etchant is HF and HCl, and in FIG. 5 the etchant is HF and $H_2SO_4$. The molarity of both HCl and $H_2SO_4$ are close to actual proton activity in the etchant, which is the essential ingredient that reduce the formation of sludge. The dashed line boxes highlighted areas in which both HCl and $H_2SO_4$ work in the same way in reducing the quantity of precipitation at different dissolving glass conditions (4 g/L, 7 g/L, and 10 g/L) and at different temperature conditions (22° C., 27° C., and 32° C.). The patterns in each corresponding conditions follow the same trend.

FIG. 7 illustrates that increasing fluoride ion concentration in solution generates more precipitation from etchant containing 4 grams of dissolved glass. The fluoride ion concentration is calculated based on the concentration of HF and HCl and $H_2SO_4$ and the dissociation constant of HF. The encircled dots are data from HF/$H_2SO_4$ system, and the non-circled dots are data from HF/HCl system. The plot shows that an increase of fluoride ion concentration generates more precipitate.

Figure 8:
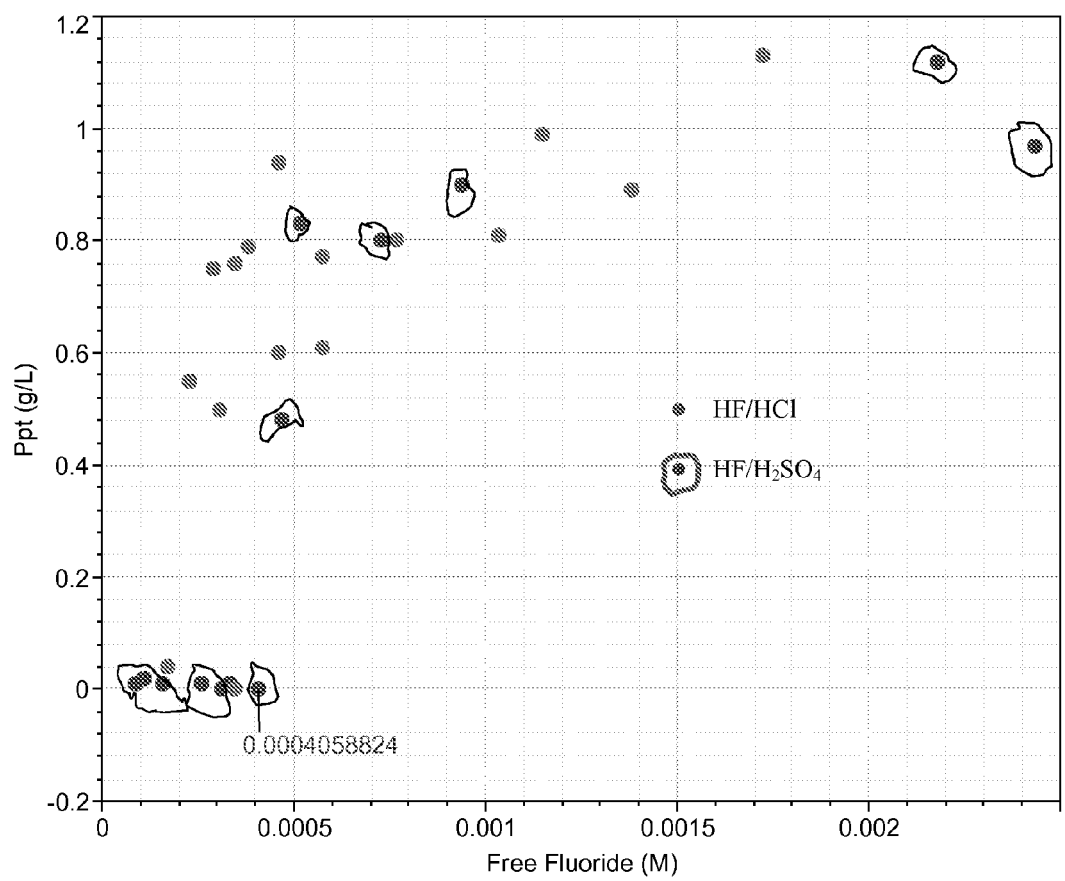
FIG. 8 is a nonlinear model fitting of the precipitation data using JMP plotted versus fluoride ion concentration calculated based on the concentration of HF and second acid ($H_2SO_4$ in this case). The nonlinear model equation fitted to the data is.

FIG. 8 is a nonlinear model fitting (using JMP Statistics Software from SAS Institute Inc., Cary, N.C.) of the precipitation data plotted versus fluoride ion concentration calculated based on the concentration of HF and second acid ($H_2SO_4$ in this case). The nonlinear model equation fitted to the data is ppt (g/L)=theta 1−theta 2/[F⁻]$^{theta\ 3}$ based on Equation 1 presented herein. The term [F⁻] is the fluoride ion concentration in the etchant.

The method of the disclosure demonstrates several advantages over the previous strategy in sludge management which are described below.

(1) The method is simple and effective in sludge management. Simply tuning the four factors, the quantity of sludge can be significantly reduced. Tuning these factors does not require much of change in plant for glass etching. The quantity of sludge can be reduced by tuning one factor or multiple factors and it can be easily implemented in the plant.

(2) The method disclosed herein can reduce the cost for glass etching. The cost can be reduced by reducing the concentration of HF while increasing the concentration of the second acid. This change can reduce the cost for raw materials, and also reduce the quantity of sludge in the system. The reduction of sludge provides at least two benefits. First, the etchant can be used for longer time and with better efficiency before recycling, which can further reduce the cost of material consumption. Second, the operation does not require frequent maintenance to clean up the sludge, which also reduces the cost for production.

(3) In addition to being applicable aluminosilicate glasses, the method can be used with other glass compositions, for example without limitation, borosilicate glasses and aluminoborosilicate glasses as well as glasses that contain metal ions that form a precipitate, for example without limitation glass containing alkaline earth metals, zirconium, iron and titanium. The theory and strategy claimed in this disclosure is developed based on the fundamental understanding of the chemistry of sludge formation. It can be widely applied for manipulating sludge of various types of glass with an appropriate modification to the strategy.

(4) The disclosure is easy to implement. The mathematical model we developed can be easily followed and employed for predicting the quantity of sludge. Once the model is developed, the prediction is easy, accurate and reliable. Our initial experiment study has proved it.

(5) This disclosure applies to any HF-based etching processes and applications, including glass thinning for LCDs, surface and edge strengthening of ion exchangeable and non-ion exchangeable glasses, etching leading to different geometries and holes, and to functional surfaces such as anti-glare and anti-reflections.

(6) Reduction or elimination of sludge particles in the etching solution can simplify the post-etching cleaning processes, or eliminate the need for contact cleaning such as brush cleaning, which can potentially damage the surface and compromise the mechanical and/or optical properties of the etched products.

This disclosure describes a strategy to control and reduce the formation of sludge (or precipitate) in the etching process of glass including EXG glass or glass that forms precipitates containing metal ions from the glass and anions from etchant (such as fluoride ion) or developed from the etchant (such as $SiF_6^{2-}$, $AlF_6^{3-}$, et cetera). In this method, manipulation of sludge formation is achieved based on the understanding of the chemistry reaction between HF and the glass to be dissolved (FIG. 1). The formation and quantity of sludge is determined by the four factors including: Factor (A), the quantity of glass initially dissolved in etchant; Factor (B), the concentration of HF; Factor (C), the concentration of second acid; and Factor (D), factors that influence Ksp value of the insoluble salt, such as temperature and total ionic strength of the etching solution (see FIG. 2).

Specifically, to manipulate the formation of sludge, one can:

(A) Reduce the quantity of glass dissolved in etchant, which reduces the concentration of metal ions through reaction (1). The reduced metal ion concentration then further minimizes the formation of sludge through reaction (5).

(B) Reduce the concentration of HF. By reducing the concentration of HF, the fluoride ion concentration decreases, which in turn reduces the formation of sludge between metal ions and fluoride ion according to reaction (5).

(C) Increase the concentration of second acid. The function of second acid is to regulate the concentration of fluoride ion in etchant. Because the proton from second acid (Reaction (3)) can combine with fluoride ion and regenerate HF (reaction (4)), which limits the amount of fluoride ion released from HF. As a result, the addition of second acid reduces the production of fluoride ion from HF, and reduces the formation of sludge from the fluoride ion and metal ions.

(D) The solubility constant Ksp is the constant that determines the critical concentration that metal ions begin to precipitate with fluoride ion. A higher Ksp value means more metal ions and fluoride ion can stay in the solution without precipitating out. Increasing the solution temperature and reducing the total ionic strength can keep the Ksp value higher and the quantity of sludge lesser.

To validate the aforementioned theory and factors on sludge management, experimental study was conducted by dissolving certain amount of glass powder in the etchant containing HF and a second acid. As an exemplary glass Eagle XG™ glass, herein simple referred to as "glass in all instances unless specified otherwise, was ground into powder with the particle size smaller than 100 micron. Etchants were prepared by diluting selected amounts of concentrated HF (49 wt. %) and HCl (36 wt. %) or $H_2SO_4$ (98 wt. %) into deionized (DI) water. The concentration of HF and the second acid, HCl or $H_2SO_4$, are labeled in all the figures and experiments as their final concentrations after the etching of EXG glass powder. Theoretically, per gram, the glass consumes 0.098 mole of HF in the etching process. To dissolve glass, glass powder and etchant were initially mixed together in a Nalgene® plastic bottle using magnetic stirring. The solution was then stirred for 5 days to allow the development of precipitate in the post etching solution. Finally, the precipitate was separated from the etchant by centrifugation, dried at room temperature, and weighed for analysis. The detail procedure is described below:

Procedure:

(1) Prepare an etchant containing HF and a second acid (HCl or $H_2SO_4$).

(2) Weigh a selected of glass powder for etching.

(3) Mix the glass powder and the etchant in a plastic vessel, for example a Nalgene® plastic bottle, with magnetic stirring at 600 rpm.

(4) Keep the solution under magnetic stirring at constant temperature (e.g. 22° C., 27° C., or 32° C.), for 5 days, and monitor the change of the solution and the evolution of the precipitate.

(5) On day 6, stop stirring the solution and allow all of the precipitate to settle down to the bottom of the bottle and the solution become clear. Decant most of the clear solution to a waste container (or save for further testing), and transfer the remainder of the solution and all the precipitate into a pre-weighed centrifuge tube. The precipitate was separated from the etchant by centrifugation at 4500 rpm for 5 minutes. Decant the supernatant, and the pellet (the precipitate) is re-suspended in 15 mL of 100% ethanol and again centrifuged at 4500 rpm for 5 minutes to wash out the residue of the etchant and to accelerate the drying of the precipitate.

(6) The separated precipitate was dried in fume hood at room temperature for one to two days. The dried precipitate was weighed and further analyzed using XRD for crystal phase study or ICP (inductively coupled plasma) for the composition study.

(7) The supernatant collected from step (5) was also studied using ICP.

Results and Analysis:

I. Composition and Phase Analysis

The major components in the Eagle XG™ glass include silicon oxide, calcium oxide, aluminum oxide and magnesium oxide. After these metal oxides are dissolved by HF or etchant containing HF, the metal ions can precipitate out together with anions such as fluoride ion. Table 1 shows the possible combinations of the precipitates and their solubilities in water. On the basis of these values, calcium and magnesium are the major contributors and components to precipitate. Silicon is unlikely to precipitate since $H_2SiF_6$ is very soluble in aqueous solution. Aluminum is not precipitating as AlF3, but may precipitate together with other metal ions.

Table 1 is a solubility chart of salts in grams of dissolved salt in 100 gram of water at a temperature of 22° C. unless otherwise specified. The cations and anions may exist and react with each other after glass is dissolved. The data are obtained from the CRC Handbook of Chemistry and Physics (CRC Press: Boca Raton, Fla.).

TABLE 1

| | Calcium(II) ($Ca^{2+}$) | Magnesium(II) ($Mg^{2+}$) | Strontium(II) $Sr^{2+}$ | Aluminum (III) ($Al^{3+}$) | Potassium (I) ($K^+$) | Sodium(I) ($Na^+$) |
|---|---|---|---|---|---|---|
| Fluoride ($F^-$) | 0.0016 at 18° C. | 0.013 | 0.012 | 0.5 | 94.9 | 4.06 |
| Chloride ($Cl^-$) | 74.5 | 55 | 52.9 | 45.8 | 34.2 | 35.89 |
| Sulphate ($SO_4^{2-}$) | 0.274 | 33.7 | 0.0113 at 0° C. | 36.4 | 11.1 | 19.1 |

TABLE 1-continued

|  | Calcium(II) ($Ca^{2+}$) | Magnesium(II) ($Mg^{2+}$) | Strontium(II) $Sr^{2+}$ | Aluminum (III) ($Al^{3+}$) | Potassium (I) ($K^+$) | Sodium(I) ($Na^+$) |
|---|---|---|---|---|---|---|
| fluorosilicate ($SiF_6^{2-}$) | 0.518 | 30.8 | 3.2 at 15° C. |  | 1.167 | 6.92 |
| fluoroborate ($BF_4^-$) |  |  |  |  | 0.44 | 108 at 26° C. |

For Eagle XG™ glass, the dried precipitate appears at white powder. ICP analysis (Table 2) suggests that precipitate is composed majorly of calcium and aluminum materials, and if the dissolved glass level is high (e.g. 10 g/L) magnesium also appears in the precipitate. This result confirms our prediction made from Table 1. As was expected, silicon stays in the solution without participating in the precipitation. Aluminum precipitates along with calcium and magnesium, but not by itself. XRD results (FIG. 3) shows magnesium and aluminum form precipitate at 1:1 ratio and their crystal form is $MgAlF_5(H_2O)_2$.

However, the contribution from magnesium is limited. The major components of precipitation are from calcium and aluminum substances. If the effect from magnesium is blocked out, the ratio of aluminum and calcium is always about 2:3 in molarity (see Table 2) regardless of the change of HF, HCl, $H_2SO_4$, or the dissolved glass level. This suggests that aluminum and calcium co-precipitate together at a molar ratio of 2:3. It is believed that the precipitate is $Ca_3Al_2F_{12}$ or salts of similar formed in the system of HF/HCl. For the system of HF and $H_2SO_4$, the precipitate contains 2 parts of $CaSO_4 \cdot 2H_2O$ and 3 parts of $AlF_3$ or salts of similar form. XRD result shows the existence of $CaSO_4 \cdot 2H_2O$ in the system of HF/$H_2SO_4$ (FIG. 4).

etchant containing 1.5M of HF and 1.5M of $H_2SO_4$, the quantity of precipitate is 0.56 g/L when 4 g/L of glass is dissolved, and the value for 7 g/L and 10 g/L of dissolved glass in the same etchant increases to 1.57 g/L, and 2.80 g/L respectively. This effect is validated in both HF/$H_2SO_4$ system and HF/HCl system as is shown in FIG. 5, and Table 3 below for HF/$H_2SO_4$ system, and FIG. 6 and Table 4 below for HF/HCl system.

Second, increasing the concentration of HF in etchant produces more fluoride ion in etchant. The fluoride ion can then bind with metal ions and precipitate out. Both FIGS. 5 and 6 demonstrate that precipitation becomes heavier (increases in quantity) as the concentration of HF increases. Therefore, to reduce the formation of precipitate, the concentration of HF needs to be controlled at a relatively low level.

Third, the addition of second acid is to regulate the concentration of fluoride ion released from HF, and further regulate the formation of sludge downstream. By increasing the concentration of second acid such as HCl and $H_2SO_4$, the quantity of sludge is significantly reduced. The phenomena were observed in both HF/HCl system and HF/$H_2SO_4$ system (FIGS. 5, and 6). For example, when HF concentration is locked to 1.5M and 4 g/L of glass is dissolved, the quantity of precipitation is reduced from 0.8 g/L to none by increasing

TABLE 2

Composition of precipitate that forms in different etchants and different dissolved glass levels.

| | Etchant composition | | | Dissolved | | ICP Analysis of Precipitate, | | | | | Ca/ (Al-Mg) |
|---|---|---|---|---|---|---|---|---|---|---|---|
| | HF | HCl | $H_2SO_4$ | glass | Precipitation | Wt. % based on Oxides | | | | | Molar |
| Sample | (M) | (M) | (M) | (g/L) | (g/L) | Al | Ca | Mg | Si | Sr | ratio |
| 1 | 3 |  | 3 | 4 | 0.83 | 15.8 | 25.6 | 0.046 | 0.052 | 1.30 | 1.48 |
| 2 | 3 |  | 3 | 7 | 2.32 | 14.9 | 23.8 | 0.068 | 0.049 | 1.81 | 1.46 |
| 3 | 3 |  | 3 | 10 | 4.98 | 13.9 | 18.2 | 1.83 | 0.039 | 1.58 | 1.43 |
| 4 | 1.5 |  | 1.5 | 4 | 0.48 | 18.6 | 30.3 | 0.031 | 0.033 | 1.69 | 1.48 |
| 5 | 1.5 |  | 1.5 | 7 | 1.57 | 18.1 | 28.7 | 0.063 | 0.040 | 2.27 | 1.45 |
| 6 | 1.5 |  | 1.5 | 10 | 2.80 | 16.6 | 26.5 | 0.086 | 0.045 | 2.33 | 1.46 |
| 7 | 3 | 6 |  | 4 | 0.76 | 19.2 | 30.6 | 0.036 | 0.053 | 2.88 | 1.45 |
| 8 | 3 | 6 |  | 7 | 1.80 | 21.0 | 25.2 | 4.02 | 0.071 | 2.57 | 1.44 |
| 9 | 3 | 6 |  | 10 | 5.31 | 17.5 | 19.9 | 3.86 | 0.056 | 2.05 | 1.43 |
| 11 | 1.5 | 3 |  | 7 | 1.28 | 19.7 | 31.5 | 0.049 | 0.040 | 2.29 | 1.46 |
| 12 | 1.5 | 3 |  | 10 | 2.12 | 19.7 | 31.7 | 0.081 | 0.064 | 2.60 | 1.47 |

II. Quantity of the Precipitate

The quantity of precipitate was measured by weighing the dried precipitate. Data is shown as numbers (units in g/L) next to the lines in the contour plots in FIGS. 5A-6G and 6A-6G. The quantity of precipitate in these Figures is regulated by the aforementioned four Factors in illustrated in FIG. 2 and described above.

First, increasing the quantity of dissolved glass produces more precipitate from the solution. As shown in FIG. 5, the HF/$H_2SO_4$ system shows much more precipitation as the amount of dissolved glass increases from 4 g/L (FIG. 5A) to 7 g/L (FIG. 5D), and to 10 g/L (FIG. 5G). For example, in the HCl concentration from 1M to 6M (FIG. 6A). Moreover, the real regulator for fluoride ion is free proton provided by the second acid. Because both the molarities of HCl and $H_2SO_4$ are close the actual proton concentration in the etchants, the contour figures from HF/HCl system and HF/$H_2SO_4$ system exhibit the same trends (FIGS. 5 and 6). This suggests that the function of the second acid in sludge management is to provide free proton for regulating fluoride ion and the quantity of sludge downstream. Other strong acids, for example nitric acid ($HNO_3$) and perchloric acid ($HClO_4$) can also be used as second acids.

TABLE 3

Quantity of precipitate (sludge) at different conditions in HF/H$_2$SO$_4$ system.

| | | Sludge (g/L) Temp. (° C.) | | | | | | | |
|---|---|---|---|---|---|---|---|---|---|
| | | 22 | | | 27 | | | 32 | |
| | | Dissolved Glass (g/L) | | | | | | | |
| HF (M) | H2SO4 (M) | 4 | 7 | 10 | 4 | 7 | 10 | 4 | 7 | 10 |
| 0.5 | 0.5 | 0.004 | 1.17 | 2.014 | 0.000 | 1.328 | 2.117 | 0.161 | 1.083 | 1.978 |
| 0.5 | 1.5 | 0.011 | 0 | 0.243 | | | | | | |
| 0.5 | 2.25 | 0.019 | 0 | 0.055 | | 0.000 | 0.000 | | 0.000 | 0.000 |
| 0.5 | 3 | 0.015 | 0.005 | 0.488 | | | | | | |
| 0.5 | 3.5 | 0 | 0.628 | 1.139 | 0.000 | 0.411 | 1.106 | 0.000 | 0.250 | 0.867 |
| 0.5 | 4.8 | 0.289 | 0.967 | 1.583 | 0.172 | 0.989 | 1.617 | 0.228 | 0.861 | 1.594 |
| 1 | 0.5 | 0.745 | 1.702 | 2.23 | 0.611 | 1.378 | | 0.667 | 1.367 | |
| 1 | 1.5 | 0 | 1.067 | 1.717 | 0.000 | 0.883 | | 0.000 | 0.739 | |
| 1 | 2.25 | 0 | 0.014 | 1.689 | 0.000 | 0.250 | 1.567 | 0.000 | 0.000 | |
| 1 | 3 | | 0 | 1.044 | | | | | | |
| 1 | 3.5 | 0 | 0.494 | 1.072 | 0.000 | 0.217 | 0.822 | 0.000 | 0.000 | |
| 1.5 | 0.5 | | | | 0.822 | 1.461 | | 0.722 | 1.478 | |
| 1.5 | 1.5 | 0.561 | 1.574 | 2.799 | 0.417 | 1.250 | | 0.289 | 1.283 | |
| 1.5 | 2.25 | 0 | 1.172 | 2.011 | 0.000 | 0.922 | | 0.000 | 1.044 | |
| 1.5 | 3 | 0.006 | 1.032 | 1.861 | | | | | | |
| 1.5 | 3.5 | 0 | 1.1 | 2.228 | 0.000 | 0.878 | | 0.000 | 0.644 | |
| 2 | 0.5 | 0.807 | 1.644 | 2.922 | 0.767 | 1.539 | | 0.817 | 1.700 | |
| 2 | 1.5 | 0.728 | | | 0.572 | 1.428 | | 0.650 | 1.372 | |
| 2 | 2.25 | 0.589 | 1.356 | 2.561 | 0.289 | 1.228 | | 0.261 | 1.244 | |
| 2 | 3 | 0.477 | | | | | | | | |
| 2 | 3.5 | 0.539 | 1.272 | | 0.378 | 1.178 | | 0.094 | 1.183 | |
| 3 | 0.5 | 0.975 | 2.087 | 3.258 | | | | | | |
| 3 | 1.5 | 0.897 | 1.506 | 2.679 | 0.689 | 1.494 | | 0.706 | 1.561 | |
| 3 | 2.25 | | | | 0.611 | 1.183 | | 0.556 | 1.494 | |
| 3 | 3 | 0.833 | 2.319 | 3.56 | | | | | | |
| 3 | 3.5 | 1.139 | 1.694 | | 0.628 | 1.233 | | 0.478 | 1.506 | |
| 1 | 4.8 | 0.311 | 0.906 | 1.461 | | | | | | |
| 1.5 | 4.8 | 0 | 1.194 | 2.267 | 0.061 | 0.761 | | 0.000 | 0.839 | |
| 3 | 4.8 | 1.061 | 1.805 | 3.133 | 0.978 | 2.044 | | 0.711 | 1.600 | |

TABLE 4

Quantity of precipitate (sludge) at different conditions in HF/HCl system.

| | | Sludge (g/L) Temp. (° C.) | | | | | | | |
|---|---|---|---|---|---|---|---|---|---|
| | | 22 | | | 27 | | | 32 | |
| | | Dissolved Glass (g/L) | | | | | | | |
| HF (M) | HCl (M) | 4 | 7 | 10 | 4 | 7 | 10 | 4 | 7 | 10 |
| 0.5 | 1 | 0 | 0.606 | 1.339 | 0.000 | 0.806 | 1.933 | 0.000 | 0.428 | 1.428 |
| 0.5 | 3 | 0 | 0 | 0 | 0.000 | 0.000 | 0.000 | 0.000 | 0.000 | 0.000 |
| 0.5 | 4.5 | 0 | 0 | 0 | 0.000 | 0.000 | 0.000 | 0.000 | 0.000 | 0.000 |
| 0.5 | 6 | 0 | 0 | 0 | 0.000 | 0.000 | 0.000 | 0.000 | 0.000 | 0.000 |
| 1 | 1 | 0.667 | 1.311 | 1.961 | 0.594 | 1.367 | | 0.317 | 1.350 | |
| 1 | 3 | 0 | 0.433 | | 0.000 | 0.556 | | 0.000 | 0.000 | |
| 1 | 4.5 | 0 | 0.293 | 1.367 | 0.000 | 0.356 | | 0.000 | 0.000 | |
| 1 | 6 | 0 | 0.426 | 1.383 | 0.000 | 0.700 | | 0.000 | 0.000 | |
| 1.5 | 1 | 0.811 | | | 0.633 | 1.306 | | | | |
| 1.5 | 1.8 | 0.612 | 1.402 | 1.917 | | | | 0.278 | 1.178 | |
| 1.5 | 3 | 0.001 | 1.228 | 2.117 | 0.111 | 1.167 | | 0.000 | 1.150 | |
| 1.5 | 4.5 | | 1.102 | 1.744 | 0.000 | 1.100 | | 0.000 | 0.944 | |
| 1.5 | 6 | 0.044 | 1.243 | 2.017 | 0.000 | 1.011 | | 0.000 | 0.983 | |
| 2 | 1 | 0.887 | 1.561 | 2.706 | 0.744 | 1.489 | | | | |
| 2 | 3 | 0.597 | 1.394 | 2.183 | 0.450 | 1.289 | | | | |
| 2 | 4.5 | 0.502 | 1.372 | 2.122 | 0.294 | 1.211 | | | | |
| 2 | 6 | 0.55 | 1.467 | 2.689 | 0.522 | 1.311 | | | | |
| 3 | 1 | 0.861 | 1.877 | 2.9 | 0.867 | 1.822 | | 0.828 | 1.739 | |
| 3 | 3 | 0.683 | 1.406 | 2.567 | 0.617 | 1.367 | | 0.622 | 1.433 | |
| 3 | 4.5 | 0.943 | 1.606 | | 0.544 | 1.572 | | | | |
| 3 | 6 | 0.756 | 1.804 | 2.956 | 1.061 | 2.744 | 3.683 | 0.678 | 1.806 | |

Lastly, the effect of ionic strength becomes significant when the total concentration of solutes increases to certain level. For example, in FIG. 6, when the HF concentration is higher than 2M, the quantity of precipitate starts to increase by increasing the HCl concentration from 3M to 6M. Although increasing HCl concentration provides more proton for fluoride ion regulation (Factor C), the total ionic strength becomes too high that adding more solute to the solution (in this case, adding more HCl) actually leads to more of the precipitate. For example, when the HF concentration is fixed at 3M and dissolved glass level at 7 g/L at 22° C. (FIG. 6B), the quantity of precipitation increases from 0.62 g/L to 1.1 g/L as the concentration of HCl increases from 3M to 6M.

Moreover, the data suggests that the temperature of the solution also plays an important role in sludge management. This is because that the solubility constant (Ksp) becomes larger as the temperature increases. Therefore, the quantity of precipitate can be reduced by increasing the temperature of the solution.

On the basis of the aforementioned theory, effects, and data, we have derived an equation for predicting the quantity of precipitation (Equation 1). The quantity of precipitation is regulated by four Factors (A-D), which are included in the formula. Some constant values need to be applied together with each Factor in able to simulate a specific system. Factor D is not taken into account until the total ionic strength becomes high enough. For example, in $HF/H_2SO_4$ system, at the dissolved glass level at 4 g/L at 22° C., the quantity of precipitation is plotted versus the fluoride ion concentration calculated from the values for Factor B and C (FIG. 7). The experimental data is then validated on the model equation ignoring the effect of Factor D (ionic strength). The fitted curve using the nonlinear model equation exhibits good agreement to the experiment data measured. The fitted function parameters of the model is:

Precipitation (g/L)=$1-6.6*10^{-9}/[F^-]^{2.4}$.

This result verifies that the formula we derived is applicable and practical in the sludge management study. It is here noted that the quantity of precipitation can not go below zero, so that the values below zero in the simulation should be zero in the real study. Equation 1 is:

Precipitation (g/L)=Factor $A$−($Ksp$/(Factor $B$/Factor $C$))+Factor $D$

Thus, in one aspect the disclosure is directed to a method for controlling the amount of sludge in a glass wet etching process, the method comprising etching a glass while controlling the hydrogen ion concentration in a HF etchant solution by the addition of a second strong acid to the etchant bath. The amount of sludge in the etchant bath is controlled to a selected level in accordance with the following Equation 1, Precipitation (g/L)=Factor $A$−($Ksp$/(Factor $B$/Factor $C$))+Factor $D$, and the four Factors in Equation 1 are
Factor A: the dissolved glass level;
Factor B, the HF concentration;
Factor C, the second acid concentration, the second acid being a strong acid; and
Factor D, the solubility constant of the precipitate, Ksp, which is controlled by changing temperature or ionic strength. The second strong acid is selected from the group consisting of HCl, $HClO_4$.$HNO_3$ and $H_2SO_4$. In one embodiment the second strong acid is selected from the group consisting of HCl and $H_2SO_4$. The glass being etched is an oxide glass selected from the group consisting of ion-exchanged and non-ion-exchanged of aluminosilicate, borosilicate and aluminoborosilicate glasses. In an embodiment the glass being etched is an oxide glass comprising, among other elements, at least one metal selected from the group consisting of alkali metals, alkaline earth metals, aluminum, zirconium, iron, and titanium. In the method the etching process is carried out at a temperature in the range of 15° C. to 40° C. In one embodiment of the method the etching process is carried out at a temperature in the range of 20° C. to 35° C. In a further embodiment the temperature is in the range of 22° C. to 32° C. In an embodiment the Free Proton Concentration of the etchant bath is maintained in the range of 0.5M to 6.0M for HF concentrations in the range of 1.0M to 4M, and the second strong acid is selected from the group consisting of HCl, $HClO_4$.$HNO_3$ and $H_2SO_4$. In an embodiment the Free Proton Concentration of the etchant bath is maintained in the range of 0.5M to 5.0M for HF concentrations in the range of 1.0M to 4M. In another embodiment the etchant bath comprises the acids HF and HCl and the Free Proton Concentration of the etchant bath is maintained in the range of 0.5M to 6.0M for HF concentrations in the range of 1.0M to 3.5M. In a further embodiment the etchant bath comprises the acids HF and $H_2SO_4$, and the Free Proton Concentration of the etchant bath is maintained in the range of 0.5M to 5.0M for HF concentrations in the range of 1.0M to 4M.

In another aspect the disclosure is directed to an acidic acid etching solution comprising an acid mixture of HF and a strong acid selected from the group consisting of HCl, $HClO_4$.$HNO_3$ and $H_2SO_4$; wherein the Free Proton Concentration of the etchant bath is maintained in the range of 0.5M to 6.0M for HF concentrations in the range of 1.0M to 3.5M when the selected strong acid is HCl, $HNO_3$ or $HClO_4$, and the Free Proton Concentration of the etchant bath is maintained in the range of 0.5M to 5.0M for HF concentrations in the range of 1.0M to 4M when the selected strong acid is $H_2SO_4$. In one embodiment the dissolved glass in the solution is less than 10 grams/L. In another embodiment the dissolved glass in the solution is less than 7 grams/L. In a further embodiment the dissolved glass in the solution is less than 4 grams/L. The etching process is carried out at a temperature in the range of 15° C. to 40° C. In one embodiment the temperature is in the range of 20° C. to 35° C. In a further embodiment the temperature is in the range of 22° C. to 32° C.

It will be apparent to those skilled in the art that various modifications and variations can be made to the present disclosure without departing from the spirit or scope of the disclosure. Thus, it is intended that the present disclosure cover modifications and variations of what is disclosed herein provided they come within the scope of the appended claims and their equivalents.

We claim:

1. A method for controlling the amount of sludge in a glass wet etching process, the method comprising etching a glass while controlling the hydrogen ion concentration in a HF etchant solution by the addition of a second strong acid to an etchant bath, wherein the amount of precipitant in the etchant bath is controlled to a selected level in accordance with the following Equation:

Precipitation (g/L)=Factor $A$−($Ksp$/(Factor $B$/Factor $C$))+Factor $D$, wherein:

Factor A is the dissolved glass level;
Factor B is the HF concentration;
Factor C is the second acid concentration, the second acid being a strong acid; and
Factor D is the solubility constant of the precipitate, Ksp, which is controlled by changing at least one of temperature or ionic strength.

2. The method according to claim 1, wherein the second strong acid is selected from the group consisting of HCl, $HClO_4$, $HNO_3$ and $H_2SO_4$.

3. The method according to claim 1, wherein the second strong acid is selected from the group consisting of HCl and $H_2SO_4$.

4. The method according to claim 1, wherein the glass being etched is an oxide glass selected from the group consisting of aluminosilicate, borosilicate and aluminoborosilicate glasses.

5. The method according to claim 1, wherein the glass being etched is an oxide glass comprising at least one metal selected from the group consisting of alkali metals alkaline earth metals, aluminum, zirconium, iron, and titanium.

6. The method according to claim 1, wherein the etching process is carried out at a temperature in the range of 15° C. to 40° C.

7. The method according to claim 1, wherein the etching process is carried out at a temperature in the range of 20° C. to 35° C.

8. The method according to claim 1, wherein the Free Proton Concentration of the etchant bath is maintained in the range of 0.5M to 5.0M for HF concentrations in the range of 1.0M to 4M.

9. The method according to claim 1, wherein the etchant bath comprises the acids HF and HCl, and the Free Proton Concentration of the etchant bath is maintained in the range of 0.5M to 6.0M for HF concentrations in the range of 1.0M to 3.5M.

10. The method according to claim 1, wherein the etchant bath comprises the acids HF and $H_2SO_4$, and the Free Proton Concentration of the etchant bath is maintained in the range of 0.5M to 5.0M for HF concentrations in the range of 1.0M to 4M.

11. The method according to claim 1, wherein the Precipitation (g/L) produced is less than about 4.0 g/L.

12. The method according to claim 1, wherein the Precipitation (g/L) produced is less than about 1.0 g/L.

13. The method according to claim 11, wherein the Precipitation (g/L) produced is controlled by manipulating at least one of Factor A and Factor D.

14. The method according to claim 1, wherein Factor A is at least about 4.0 g/L.

* * * * *